United States Patent
Petersen et al.

(10) Patent No.: US 6,565,061 B1
(45) Date of Patent: May 20, 2003

(54) RADIAL SNUBBER FOR VIBRATION ISOLATOR

(75) Inventors: Mark Edward Petersen, Largo, FL (US); William P. Adkins, Jr., Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/675,457

(22) Filed: Sep. 28, 2000

(51) Int. Cl.⁷ .................................. F16M 1/00
(52) U.S. Cl. ........................ 248/638; 248/562
(58) Field of Search .................. 248/638, 560, 248/562, 609, 634

(56) References Cited

U.S. PATENT DOCUMENTS

| | | | |
|---|---|---|---|
| 2,393,071 A | | 1/1946 | Schaelchlin |
| 4,032,202 A | | 6/1977 | Ishikawa et al. ............ 308/238 |
| 4,392,640 A | | 7/1983 | Kakimoto ................. 267/141.2 |
| 4,645,190 A | | 2/1987 | Schad ........................ 267/141 |
| 4,826,126 A | * | 5/1989 | Katayama et al. .......... 248/562 |
| 5,074,535 A | | 12/1991 | Colford ....................... 267/293 |
| 5,170,997 A | * | 12/1992 | Girard et al. ................. 267/35 |
| 5,489,087 A | | 2/1996 | Bitschkus .................... 267/141 |
| 5,834,939 A | * | 11/1998 | Makhija ..................... 324/402 |
| 5,899,431 A | * | 5/1999 | Lefol ......................... 248/635 |
| 5,927,407 A | * | 7/1999 | Gwinn et al. ............ 173/162.2 |
| 5,944,297 A | * | 8/1999 | Flower et al. .............. 248/638 |
| 5,992,816 A | * | 11/1999 | Yosida et al. ............... 248/638 |
| 6,056,279 A | * | 5/2000 | Lee et al. .............. 267/140.13 |
| 6,113,030 A | * | 9/2000 | Law et al. .................... 244/54 |
| 2001/0032919 A1 | * | 10/2001 | Hagino et al. .............. 248/562 |

FOREIGN PATENT DOCUMENTS

| | | | |
|---|---|---|---|
| EP | P 0 255 434 A1 | * 7/1987 | ............ F16F/13/00 |
| JP | 07158675 | 6/1995 | |
| JP | 09280314 | 4/1996 | |
| JP | 11210795 | 8/1999 | |

OTHER PUBLICATIONS

International Search Report

* cited by examiner

*Primary Examiner*—Ramon O. Ramirez
*Assistant Examiner*—Kofi Schulterbrandt
(74) *Attorney, Agent, or Firm*—Michele Burris Holden

(57) ABSTRACT

The present invention is directed to a radial snubber for use with a vibration isolator. The radial snubber cushions any impact of the aluminum insert of the isolator against the remainder of the isolator, thereby reducing the strain experienced by the isolator.

12 Claims, 1 Drawing Sheet

RADIAL SNUBBER FOR VIBRATION ISOLATOR

FIELD OF THE INVENTION

This invention relates generally to snubber devices and more particularly to a snubber device for an elastomeric vibration isolator.

BACKGROUND OF THE INVENTION

The guidance system for a missile program requires an inertial sensor assembly that can survive a severe shock input, such as one of 400 Gs (1 G equals the force of gravity). The inertial sensor assembly comprises sensors, such as accelerometers and gyroscopes, mounted to a rigid aluminum structure. Because the accelerometers and gyroscopes are relatively fragile instruments, they are isolated from external vibration and shock inputs by means of vibration isolators. It is the function of the vibration isolators to absorb the high energy of the shock input, thereby protecting the sensors. The shock input that must be absorbed by this particular inertial sensor assembly greatly exceeds the requirements of other current programs utilizing the same hardware.

Under high radial shock loads, the internal metal insert of an isolator deflects and can impact the outer element of the isolator, thereby creating excessive G forces. This places a great amount of strain on the isolator, which reduces the survivability of the system in the shock environment. This deflection of the isolators can also damage the sensors mounted thereon.

One option would be to stiffen the isolators by constructing them of different, stiffer material. Although this would lead to reduced deflection of the isolator, the isolator would not absorb the energy of the shock input and, as a result, the sensors would be damaged. Thus, this option is not feasible.

Another option would be to greatly increase the size of the isolator such that the inner element could not impact the outer element. Due to the size constraints of the guidance system, however, this option is not practical.

Thus, there is a need in the art for a way to reduce the strain experienced by a vibration isolator under high G loading.

There is a further need in the art for a cost-effective way to increase the survivability of a vibration isolator in a shock environment.

SUMMARY OF THE INVENTION

The present invention meets the needs of the prior art by providing a radial snubber that reduces the strain experienced by a vibration isolator. The radial snubber is placed about the inner element of the isolator. Under high G loading, the snubber cushions the impact of the inner element against the remainder of the isolator. Thus, the deflection of the inner element is avoided, thereby reducing strain on the isolator and damage to the inertial sensors.

DETAILED DESCRIPTION OF THE INVENTION

Figure 3:
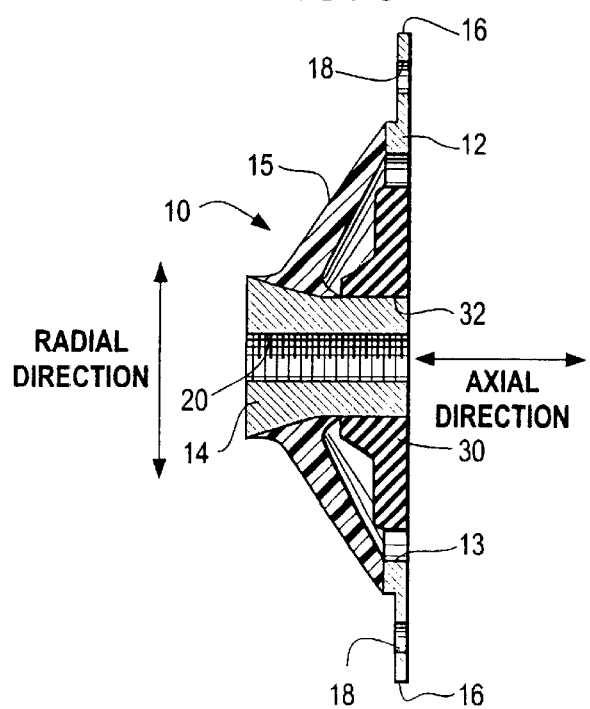
FIG. 3 is a cross-sectional view of the radial snubber of the present invention in use with an isolator.
Figure 4:
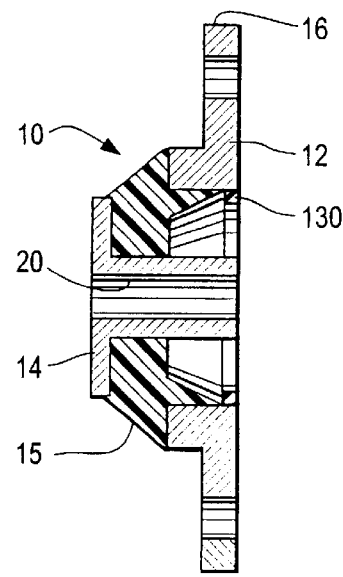
FIG. 4 is a cross-sectional view of an alternate embodiment of the radial snubber of the present invention in use with an isolator.

The present invention is depicted in FIGS. 3 and 4 and is intended for use with a vibration isolator 10, shown in FIGS. 1–4. Such a vibration isolator is available from Lord Corporation, Erie, Pa. The vibration isolator 10 generally includes an outer element 12 and an inner element 14. The outer element 12 has a central opening 13 through which the inner element 14 extends. As can be seen best in FIGS. 2 and 3, the inner element 14 is attached to the outer element 12 by means of an elastomeric member 15, preferably constructed of a silicon elastomer, such as Broad Temperature Range (BTR) type, available from Lord Corporation, Erie, Pa. This elastomeric member 15 absorbs the energy from external vibration and shock loading such that the energy level is reduced on the inertial sensor assembly.

Figure 1:
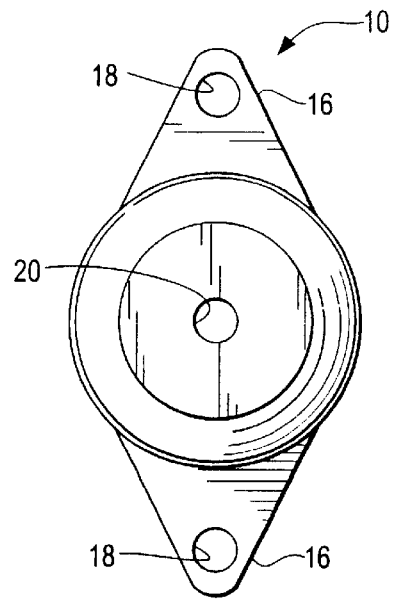
FIG. 1 is a top view of an isolator used with the present invention.
Figure 2:
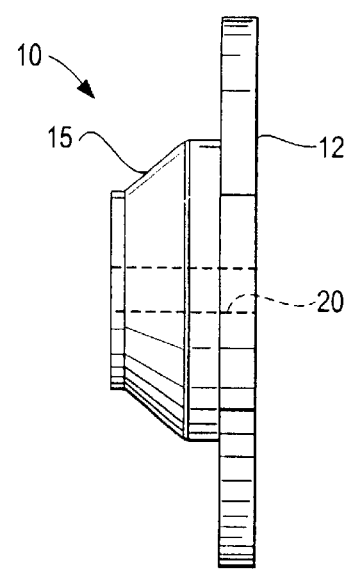
FIG. 2 is a side view of the isolator of FIG. 1.

The outer element 12 of the isolator 10 further includes two flanges 16 for attaching to the chassis of the guidance system. As can be seen in FIGS. 1 and 3, each flange 16 defines an aperture 18 for mating with an appropriate fastener (not shown).

The inner element 14 is comprised of a threaded metal insert. As can be seen in FIG. 3, the insert 14 is provided with a central aperture 20 for mounting an inertial sensor assembly to the isolator. The insert 14 is preferably constructed of aluminum.

The present invention is directed to a radial washer or snubber 30 for use with isolator 10. The snubber 30 is constructed of rubber, preferably die-cut from a sheet of elastomeric material similar to that used in the isolator construction. The snubber 30 is provided with a central opening 32 to accommodate the outer diameter of the aluminum insert 14. As shown by the arrows in FIG. 3, the snubber 30 is mounted to the aluminum insert 14 of the vibration isolator 10. The washer or snubber 30 can be molded onto the insert 14 or bonded to the insert 14 with a silicon glue such as Dow Corning 3145RTV.

Referring to FIG. 4, an alternate embodiment of the radial snubber is depicted. Since the isolator of FIG. 4 is similar to the isolator of FIG. 3, the same reference numerals are used to denote common elements. The isolator of FIG. 4 differs from the isolator of FIG. 3 in the placement of the radial snubber 130. As can be seen from FIG. 4, the radial snubber 130 is mounted to the outer element 12 of the isolator 10. The snubber 130 may be molded onto the outer element 12 or bonded thereto.

In the preferred embodiment, the radial snubber has a 0.45 inch outer diameter and a 0.25 inch inner diameter. These dimensions allow clearance during normal usage such that the frequency characteristics of the isolator are not altered. It should be understood that the dimensions of the radial snubber may change, depending upon the type of vibration isolator with which the snubber is used.

When the isolator undergoes a high G radial load (for example, >400 G), the inner element tends to move against the outer element. With the radial snubber in place, the impact of the aluminum insert against the outer element is cushioned. The radial snubber absorbs the energy of the impact in a controlled fashion. Thus, the inner element does not directly impact the outer element and the creation of excessive Gs is avoided.

It should be understood that the present invention is not limited to use with only a single type of isolator or a single type of application. Rather, it may be used with any number of vibration or shock isolators in various applications.

While the invention has been described in connection with certain embodiments, it should be understood that it is not intended to limit the invention to these particular embodiments. To the contrary, it is intended to cover all alternatives, modifications and equivalents falling within the spirit and scope of the invention.

What is claimed is:

1. A system for reducing the shock experienced by an inertial sensor assembly of a missile guidance system comprising:
    an inertial sensor assembly for use in a missile guidance system; and
    a vibration isolator for mounting the inertial sensor assembly to a chassis of the missile guidance system, the vibration isolator comprising:
        an outer element for mounting the isolator to the chassis, the outer element defining a central opening;
        an inner element extending through the central opening of the outer element for mounting the inertial sensor assembly to the isolator;
        an elastomeric member for attaching the inner element to the outer element; and
        a radial snubber mounted on the isolator to cushion an impact of the inner element against the outer element, thereby reducing the strain experienced by the vibration isolator.

2. The system of claim 1 wherein the inner element comprises a metal insert.

3. The system of claim 1 wherein the inner element defines a central aperture for mounting the inertial sensor assembly to the isolator.

4. The system of claim 1 wherein the radial snubber is mounted on an outer diameter of the inner element.

5. The system of claim 1 wherein the radial snubber is molded onto the inner element.

6. The system of claim 1 wherein the radial snubber is bonded to the inner element.

7. The system of claim 6 wherein silicon glue is used to bond the snubber.

8. The system of claim 1 wherein the radial snubber is mounted on an inner diameter of the outer element.

9. The system of claim 1 wherein the radial snubber is molded onto the outer element.

10. The system of claim 1 wherein the radial snubber is bonded to the outer element.

11. The system of claim 10 wherein silicon glue is used to bond the snubber to the outer element.

12. The system of claim 1 wherein the radial snubber is die-cut from an elastomeric material.

* * * * *